(12) United States Patent
Lee et al.

(10) Patent No.: US 10,469,165 B1
(45) Date of Patent: Nov. 5, 2019

(54) SYSTEMS AND METHODS FOR IDENTIFYING A SOURCE OF NODE RETURN SYSTEM DEGRADATION

(71) Applicant: CSC Holdings, LLC, Bethpage, NY (US)

(72) Inventors: Robert Lee, Mastic Beach, NY (US); Eugene Neary, Middle Island, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/837,592

(22) Filed: Dec. 11, 2017

Related U.S. Application Data

(63) Continuation of application No. 15/222,763, filed on Jul. 28, 2016, now Pat. No. 9,876,564.

(51) Int. Cl.
*H04B 10/40* (2013.01)
*H04B 10/50* (2013.01)
*H04B 10/60* (2013.01)
*H04B 10/25* (2013.01)
*H04B 10/079* (2013.01)

(52) U.S. Cl.
CPC ..... *H04B 10/0791* (2013.01); *H04B 10/0793* (2013.01); *H04B 10/25* (2013.01); *H04B 10/079* (2013.01); *H04B 10/0795* (2013.01); *H04B 10/0799* (2013.01); *H04B 10/07955* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 4,420,840 A | 12/1983 | Livermore |
| 6,704,288 B1 | 3/2004 | Dziekan et al. |
| 2009/0007210 A1 | 1/2009 | Nishide et al. |
| 2010/0322214 A1 | 12/2010 | Workman et al. |

OTHER PUBLICATIONS

U.S. Appl. No. 15/222,763, filed Jul. 28, 2016, entitled "Systems and Methods for Identifying a Source of Node Return System Degradation".

*Primary Examiner* — Darren E Wolf
(74) *Attorney, Agent, or Firm* — Sterne, Kessler, Goldstein & Fox P.L.L.C.

(57) ABSTRACT

Embodiments include a system, method, and a computer program product for identifying a cause of return system degradation. Embodiments include monitoring a network to identify a distressed node impacted by return system degradation, polling a plurality of cable modem devices serviced by the distressed node for transmission parameter values, scoring the transmission parameter values for each of the plurality of cable modem devices, identifying a cable modem device from among the plurality of cable modem devices causing the return system degradation based on the scores of each of the plurality of cable modem devices, and initiating a work order to repair the cable modem device from among the plurality of cable modem devices causing the return system degradation.

19 Claims, 4 Drawing Sheets

SYSTEMS AND METHODS FOR IDENTIFYING A SOURCE OF NODE RETURN SYSTEM DEGRADATION

CROSS-REFERENCE TO RELATED APPLICATIONS

The present application is a continuation of U.S. patent application Ser. No. 15/222,763, filed Jul. 28, 2016, which is incorporated herein by reference in its entirety.

FIELD

Embodiments generally relate to cable networks and more specifically to identifying causes of return system degradation in a cable system.

BACKGROUND

In cable systems, such as a Hybrid Fiber Coaxial ("HFC") network, a return can accommodate two-way connectivity for TV, Voice, and Data that is shared by several customers. A return system of the HFC network is "shared" by all of the customers, i.e., each signal from a customer site is funneled to the same node in a sequence of transmissions. The signals from each customer site, however, carry interference, e.g., noise and ingress, that can compromise the return system. In other words, the interference may enter the normally "shielded" coaxial cable thereby degrading performance of the return system. As a result, a problem at a customer site can compromise the service for all customers on that node, limiting return transmission required to support services of the HFC. However, it can be difficult and costly to determine whether the problem occurs due to a common system element or due to a problem at a customer site, especially which customer site it may be.

BRIEF DESCRIPTION OF THE DRAWINGS/FIGURES

DETAILED DESCRIPTION OF EMBODIMENTS

Figure 1:
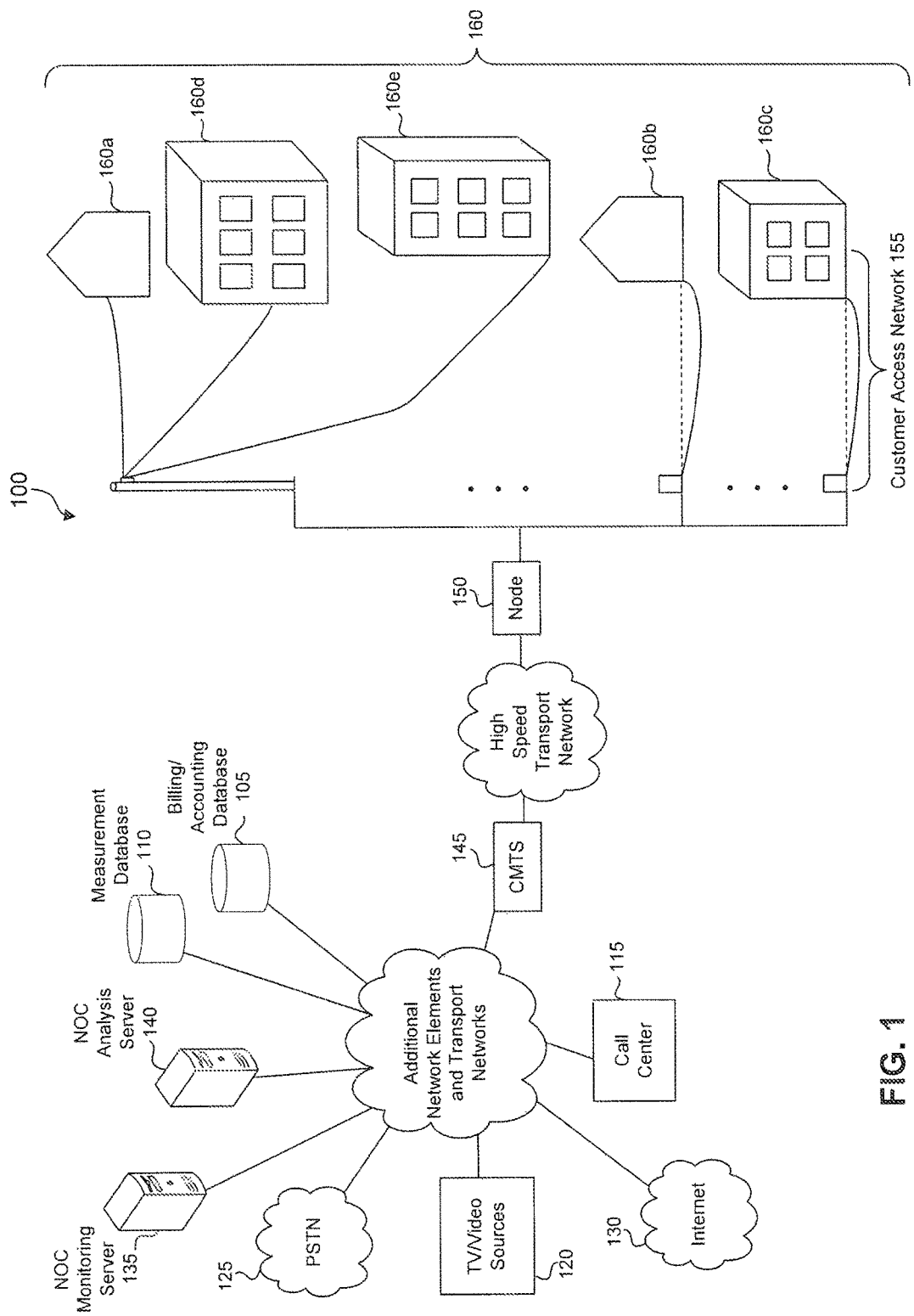
FIG. 1 illustrates an example system according to aspects of the present disclosure.

Embodiments of the present disclosure take advantage of the presence of cable modem devices coupled to a network node by analyzing data associated with every cable modem device. This analysis may be used to identify a customer site causing return system degradation and initiating a work order for a proactive service truck for that particular customer site. A proactive service truck is more efficient than sending a service truck to a coverage area serviced by a particular node and systematically splitting the coverage area in half until the distressed customer site is identified. As a result, a source of return system degradation can be more efficiently identified and repaired compared to existing methodologies of identifying a customer site causing the return system degradation. In addition, the proactive service may result an increase signal quality received by customer thereby increasing customer good will and satisfaction.

Embodiments include a system, method, and a computer program product for identifying a cause of return system degradation. Embodiments include monitoring a network to identify a distressed node impacted by return system degradation, polling a plurality of cable modem devices serviced by the distressed node for transmission parameter values, scoring the transmission parameter values for each of the plurality of cable modem devices, identifying a cable modem device from among the plurality of cable modem devices causing the return system degradation based on the scores of each of the plurality of cable modem devices, and initiating a work order to repair the cable modem device from among the plurality of cable modem devices causing the return system degradation.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 illustrates an example system 100 according to aspects of the present disclosure. The system 100, e.g., a cable system, includes a variety of network elements and transport networks that together support a variety of services including, but not limited to television and video services, Internet access, and Voice over Internet Protocol (VoIP) services. The system 100 includes a service operator network comprising network elements and transport networks including, but not limited to, servers, databases, and service centers. These servers, databases, and service centers may include, but are not limited to, billing/accounting database 105, a measurement database 110, a call center 115 (e.g., a technical services group (TSG)), TV and video sources 120, as well as access to the Public Switched Telephone Network (PSTN) 125 and the Internet 130. The system 100 also includes a Network Operation Center (NOC) monitoring server 135 and a NOC analysis server 140. Although NOC monitoring server 135 and NOC analysis server 140 are illustrated as being separate servers, a person of ordinary skill in the arts would understand that these servers may be implemented as a single server. Other servers (not shown) may support Internet Protocol (IP) address management and VoIP services. While FIG. 1 shows some network elements, the system 100 may include one or more of the same types or different types of network elements.

In some embodiments, the NOC monitoring server 135 monitors the performance of a return system of the system 100. For example, the NOC monitoring server 135 can monitor each of a plurality of nodes, e.g., node 150, within the system 100 to detect when a node is impacted by return system degradation. That is, the node in distress triggers the NOC monitoring server 135 to identify return system degradation on the node. Although FIG. 1 illustrates a single node 150, a person of ordinary skill in the arts would understand the system 100 may include more than one node 150.

The return system degradation can be caused by problems at a customer site, e.g., a compromised shield in a cable, such as a drop cable or a home cable, or interference caused by another device transmitting electromagnetic waves at the customer site, such as a microwave oven. Alternatively, the return system degradation could be caused by a common element within the system 100 rather than by a customer site. When the NOC monitoring server 135 receives an indication from a node that the return system is impacted by degradation, the NOC monitoring server 135 can poll each customer site serviced by that particular node for transmission parameter values of each cable modem device at the customer sites. Additionally, the NOC monitoring system collects the transmission parameter values from the cable modem devices and stores the transmission parameter values in the measurement database 110. In some embodiments, the transmission parameter values include a transmit power level of the cable modem device and a power diverted through an equalizer tap of the cable modem device. The transmit power level of each cable modem device may be adjusted to overcome issues such as system loss, noise, or signal ingress. In addition, each cable modem device may adapt itself to system conditions with the use of the equalizer tap. That is, each modem may divert power through the equalizer tap to compensate for system conditions. Although the present disclosure describes that transmission parameter values with respect to the transmit power level of the cable modem device and power diverted through the equalizer tap, it should be understood by those of ordinary skill in the arts that other transmission parameter values are further contemplated according to aspects of the present disclosure.

In various embodiments, the NOC analysis server 140 analyzes the transmission parameter values from the modems. In this way, the NOC analysis server 140 may identify one or more customer sites causing the return system degradation. To analyze the transmission parameter values, the NOC analysis server 140 may convert each of the transmission parameter values to a respective score and compile a composite score of each cable modem device. These composite scores, in turn, may be compared to a threshold value to identify whether a given cable modem device is a cause of the return system degradation. For example, in embodiments, a composite score above the threshold value indicates that the cable modem device is a cause of the return system degradation; whereas, a composite score below the threshold value indicates that the cable modem device is not a cause of the return system degradation.

When the return system degradation is caused by a cable modem device(s) at customer site or by cable modem devices at different customer sites, the NOC analysis server 140 can initiate a service order to dispatch a repairman to troubleshoot the particular cable modem device(s) at a given customer site causing of the return system degradation. If the NOC analysis server 140 determines that the return system degradation is caused by a common element of system 100—rather than a particular cable modem device—the NOC analysis server 140 may perform additional analysis to identify the common element causing the return system degradation.

The system 100 further includes cable modem termination system (CMTS) 145. Although FIG. 1 illustrates a single CMTS, a person of ordinary skill in the arts would understand that a plurality of CMTSs 145 can be used. The CMTS 145 is configured to provide high speed data services to cable subscribers. For example, a television program broadcast from TV/Video sources 120 may be transmitted to customer sites through the CMTS 145. To facilitate communication with the customer sites, the CMTS 145 may be connected to a node 150 by a high-speed, two-directional transport network such as an HFC network that includes optical fiber and coaxial cable. The node 150 connects the CMTS 145 to one or more subscribers, e.g., customer sites, via a plurality of customer access networks 155. The CMTS can communicate with one or modems at each customer site to instruct each cable modem device to adjust the transmit power level of the cable modem device based on system conditions.

In embodiments, the operation of each cable modem device at the customer sites is controlled by the CMTS 145. The CMTS 145 may analyze signals from each cable modem device and signal the cable modem device to adjust its signal to correct for signal impairment caused by a home drop system and the cable plant. As a result, each modem transmits at a level requested by the CMTS 145. Furthermore, each cable modem device contains an equalizer tap. This equalizer tap comprises delay lines and gain stages as would be understood by a person of ordinary skill in the arts. Output power diverted to equalizer taps changes the frequency response of the cable modem devices output. When the system is operating at perfect conditions, little or no equalization is required. However, when the cable system has physical issues, output power is diverted to compensate for the issues. Each cable modem device can be polled for energy diverted into the equalizer taps thereby identifying how each cable modem device is reacting to the system conditions. By scoring of the cable modem devices based on the transmit power level and the power diverted through the equalizer taps, it can be determined whether cable modem device is a major contributor to a node's return system degradation. Identifying the cable modem device causing the return system degradation provides the ability to quickly dispatch support to repair the condition.

The node 150 is configured to convert optical signals to electrical signals sent over the one or more customer access networks 155 and may convert electrical signals from the customer access networks 155 to optical signals that are sent over the high speed transport network to CMTS 145. In some embodiments, the node 150 may indicate to the NOC monitoring server 135 that there is signal degradation on the return system. In this way, the NOC monitoring server 135, in conjunction with the NOC analysis server 140, can implement the processes described herein to identify a cause of the return system degradation.

The system 100 further includes a plurality of customer sites 160, i.e., residential or commercial accounts. Examples of residential sites include, but are not limited to, houses 160a, 160b and an apartment in an apartment complex 160c.

Examples of commercial sites include, but are not limited to, an office building 160*d* or an apartment complex 160*e* (e.g., an owner offers cable services to apartment renters). Each of the plurality of customer sites 160 is connected to the node 150 by a respective customer access network 155. The node 150 is configured to serve as an access point for one or more cable modem devices at each of the plurality of customer sites 160. For example, the node 150 enables communication between the plurality of customer sites 160 to remaining components of the system 100 via CMTS 145. Although system 100 includes five customer access networks 155, each of which is associated with a respective customer site 160, there could be many more than five customer access networks serviced by a single node 150. For example, a single node 150 may service up to 500 customer access networks.

Figure 2:
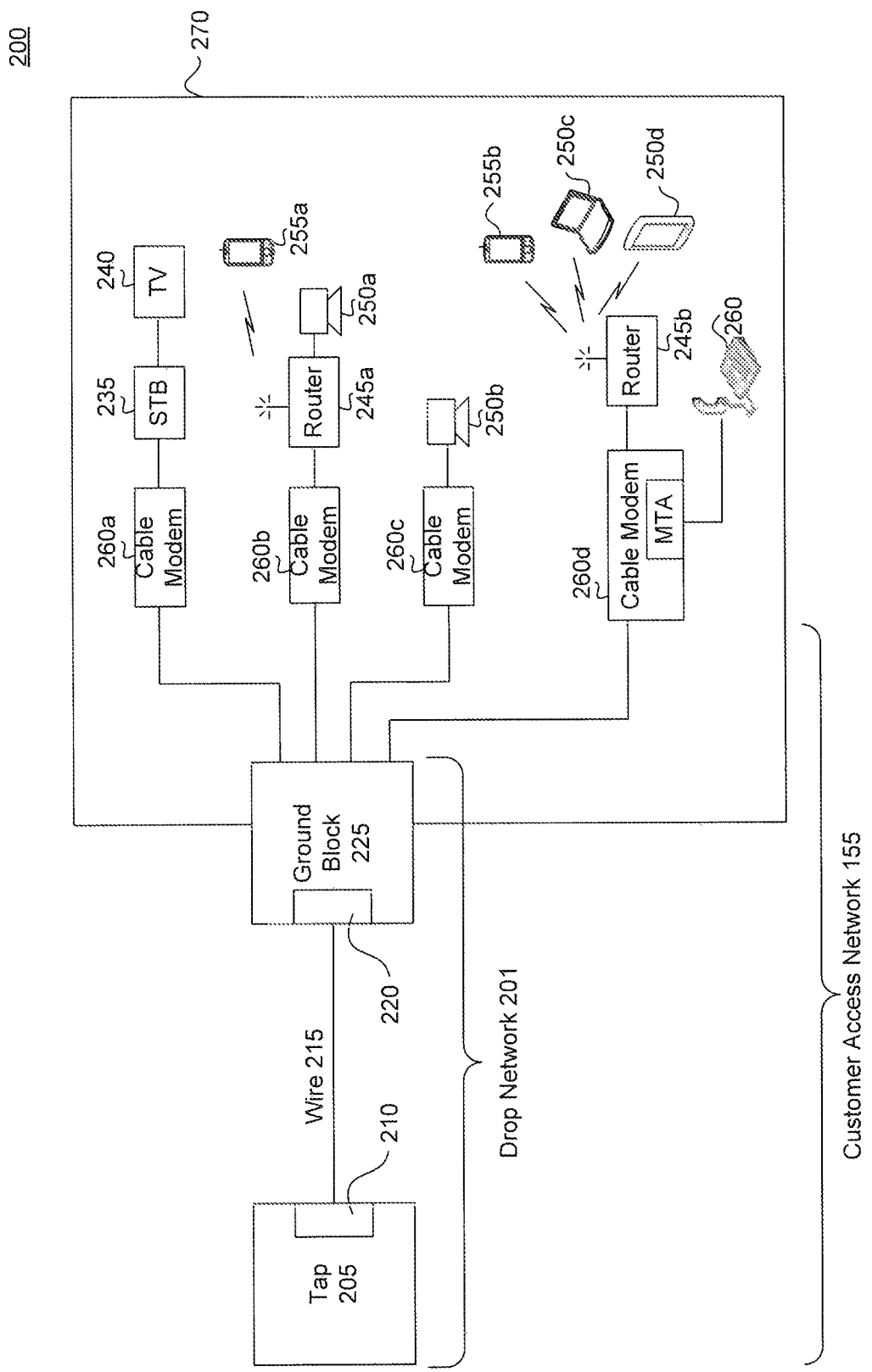
FIG. 2 illustrates a customer access network environment according to aspects of the present disclosure.

FIG. 2 illustrates a customer access network environment 200 according to an embodiment. Customer access network 155 may represent a customer access network of a plurality of customer access networks. Customer access network 155 may include a drop network 201 and customer wiring that extends from drop network 201 to a customer device including but not limited to a cable modem device 260. Drop network 201 may comprise five elements that may fail: tap 205, connection 210, wire 215, connection 220, and ground block 225. Connection 210 of tap 205 is coupled to wire 215, and wire 215 is coupled to connection 220 of ground block 225. For an aerial drop network, tap 205 may be located on a pole, and for a buried or underground drop network, tap 205 may be a pedestal near a curb. In an embodiment, ground block 225 is associated with drop network 201, a customer access network 155, and a customer account, where the customer account may be a residential account or a commercial account.

One or more cable modem devices 260*a*, 260*b*, 260*c* and 260*d* associated with a customer account and customer access network 155 may be coupled to ground block 225 directly or indirectly via a distribution block (not shown). A cable modem device 260 may include, but is not limited to a data modem, a telephony cable modem, a video cable modem (e.g., a cable modem combined with a set top box (STB), a power supply cable modem, or a Wi-Fi cable modem. A cable modem device 260 may include an Ethernet interface, a universal serial bus (USB) interface, or both. Cable modem devices 260*a*-260*d* may connect to a variety of customer-premises equipment (CPE) devices including, but are not limited to the following: set top box (STB) 235 that may connect to television 240; routers 245*a* and 245*b* that may include a wireless and/or wired home network such as a local area network; a computing device 250*b* that may include but is not limited to a personal computer, a smart TV, or a laptop. Routers 245*a* and 245*b* support equipment such as computing devices 250*a*, 250*c*, 250*d* that may include, but are not limited to, personal computers, laptops, and tablets, as well as mobile cellular devices 255*a* and 255*b*. Cable modem devices may be integrated with components such as a STB or a Multimedia Terminal Adapter (MTA) which is a VoIP adapter. For example, standard telephones may connect to an MTA to obtain VoIP service. For example, cable modem device 260*d* includes an MTA, and router 245*b* and telephone 260 connect to cable modem device 260*d*; note that telephone 260 may be a cordless telephone.

As is well known to a person of ordinary skill in the art, signals sent from a service operator network to cable modem devices 260*a*-260*d* are downstream signals. Signals sent from cable modem devices 260*a*-260*d* to a service operator network are upstream signals. The transmission parameter values may be associated with an upstream signal, and may include but are not limited to power diverted through the equalizer tap and the modem transmit output. Cable modem devices 260*a*-260*d* may respond to polls from NOC monitoring server 135 for the transmission parameter values associated with physical layer transmissions sent and received by cable modem devices 260*a*-260*d* via drop network 201. Cable modem devices 260*a*-260*d* may respond with the transmission parameter values via CMTS 150 to NOC monitoring server 135, which may then store the received transmission parameter values in measurement database 110.

Based on the responses from every cable modem device 260*a*-260*d* coupled to drop network 201, NOC analysis server 145 may determine how many cable modem devices 260 are associated with customer access network 155, and analyze each cable modem device 260 to determine which cable modem device 260, if any, is a source, or at least a part of the source, of the return system degradation. In embodiments, when cable modem device 260*a* is offline, the cable modem device 260*a* will not respond to the poll, and as such, cannot be identified as a cable modem device 260*a* causing return system degradation.

Figure 3:
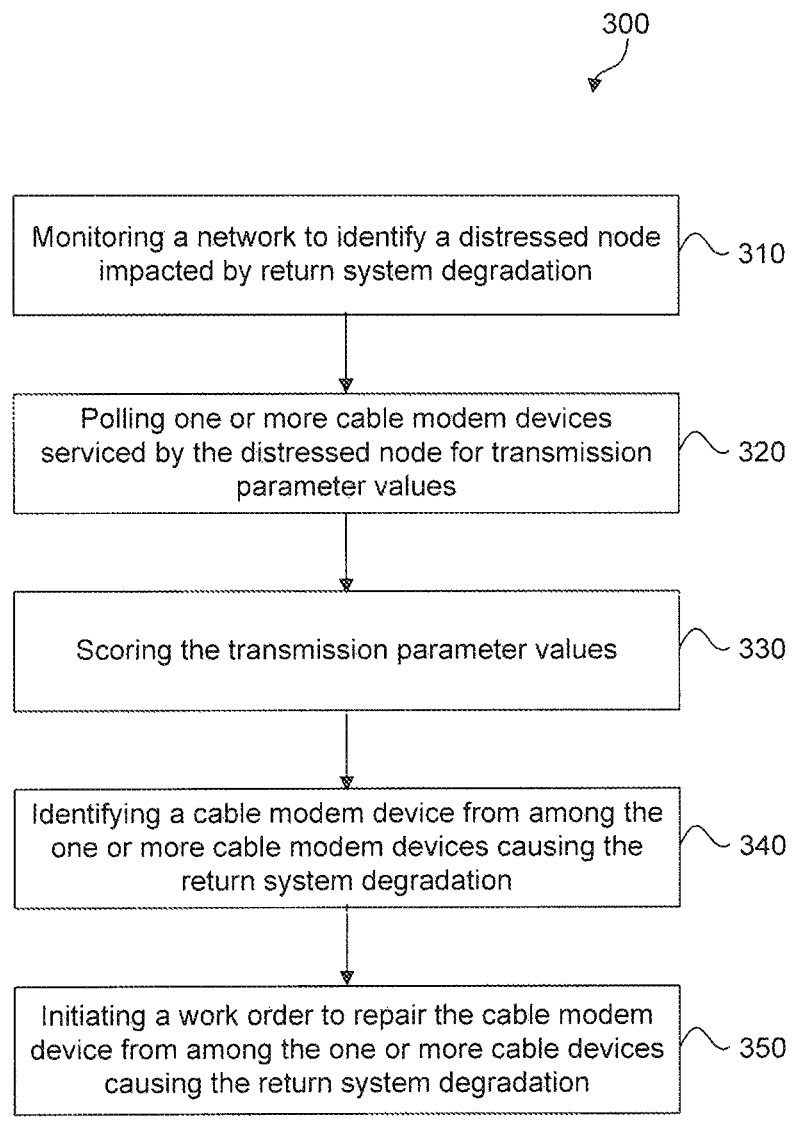
FIG. 3 illustrates a method for identifying a source of return system degradation according to aspects of the present disclosure.

FIG. 3 illustrates an example of a process flow for identifying a cause of return system degradation. A process flow 300 includes: monitoring a network to identify a distressed node with return system degradation 310; polling one or more cable modem devices serviced by the distressed node for transmission parameter values 320; scoring the transmission parameter values 330; identifying a cable modem device from among the one or more cable modem devices causing the return system degradation based on the score 340; and initiating a work order to repair the cable modem device from among the one or more cable devices causing the return system degradation 350.

The monitoring the network to identify the distressed node 310 includes monitoring a plurality of nodes within a cable system, e.g., the system 100 of FIG. 1, for an indication that a given node is impacted by return system degradation. In some embodiments, a NOC monitoring server, e.g., the NOC monitoring server 135 of FIG. 1, can monitor each of the plurality of nodes within the cable system to detect when a node impacted by return system degradation. The monitoring 310 further includes initiating an analysis of the node impacted by return system degradation.

The polling one or more cable modem devices serviced by the distressed node for transmission parameter values 320 includes polling the one or more cable modem devices for the transmission parameter values when the return system is impacted by degradation. In some embodiments, the NOC monitoring server 135 may also poll the one or more cable modem devices for the transmission parameter values. The transmission parameter values may include the transmit power level of the one or more cable modem devices and power diverted through the equalizer tap of the one or more cable modem devices. In embodiments, these transmission parameter values may be stored in a measurement database, e.g., the measurement database 110 of FIG. 1, for analysis.

The scoring the transmission parameter values 330 includes converting the transmission parameter values to respective scores and compiling the respective scores to generate a composite score. In some embodiments, a NOC analysis server, e.g., the NOC analysis server 140 of FIG. 1, may convert each of the transmission parameter values to a respective score and compile a composite score of each modem based on the respective scores. For example, the transmission parameter values can be scored based on Tables 1 and 2 as illustrated below:

TABLE 1

Power Diverted Through the Equalizer Tap

| Post-Tap Sum | Score |
|---|---|
| ≤−30.0 dB | 0 |
| ≥−29.9 dB | 2 |
| ≥−20.0 dB | 10 |
| ≥−15.0 dB | 15 |
| ≥−10.0 dB | 20 |

TABLE 2

Transmit Power Level of the Modem

| Tx dBmV | Score |
|---|---|
| ≥51.0 dBmV | 0 |
| ≤50.9 dBmV | 3 |
| ≤46.0 dBmV | 6 |
| ≤42.0 dBmV | 9 |
| ≤38.0 dBmV | 12 |

As illustrated in Tables 1 and 2, the power diverted through the equalizer and the transmit power level of the modem can each be assigned one of five different scores. For example, a power diverted through the equalizer with a measurement of ≤−30.0 dB is given a score of 0. Similarly, transmit power level of ≥51.0 dBmV is also given a score of 0. Thus, a power diverted through the equalizer of ≤−30.0 dB and a transmit power level of ≥51.0 dBmV do not contribute to the return system degradation. It should be understood by those ordinary skill in the art that the scores illustrated in Tables 1 and 2 are merely examples, and that other scores can also be assigned. For example, additional measurements and respective scores can also be used, such that the scoring mechanism has a higher level of granularity. Alternatively, the respective measurements may be given a score of on a scale of 1-2-3-4-5, etc.

As each measurement increases, the more the transmission parameter values contribute to the return system degradation, and as such, the score given to each of the transmission parameter values progressively increases. In other words, as the measurements of the diverted power and the transmit power level increase, the score given to each is progressively higher to indicate the higher level of contribution to the return system degradation. As illustrated in Tables 1 and 2, the progression of the scores as the severity of the measurements increases is a non-linear pattern. However, it is also contemplated that the scores can be modeled to follow a linear progression. Alternatively, the scores can be modeled to exponentially increase based on the values of the measurements of the power diverted through the equalizer tap and the transmit power level of the modem. It should be further understood by those of ordinary skill in the arts that other data analytics tools and algorithms to model and score each of the transmission parameter values are contemplated by the present disclosure.

The identifying a cable modem device from among the one or more cable devices causing the return system degradation based on the score 340 comprises comparing the composite score against a threshold value to identify a cable modem device from among the one or more cable modem devices causing the return system degradation. In some embodiments, a NOC analysis server, e.g., the NOC analysis server 140 of FIG. 1, may compare the composite score to the threshold value. The threshold value may be a composite score of 19. Although the zthreshold value is indicated as being a composite score of 19, it should be understood by those of ordinary skill in the art that any threshold value is contemplated by the present disclosure. For example, the threshold value may be one or more ranges of values, such that a composite score within a particular range indicates a level of contribution to the return system degradation. In embodiments, a first range may be a score of, for example, 17 to 19, thereby indicating that the level of contribution to the return system degradation is "moderate," and a second range may be a score of, for example, above 19, the level of contribution to the return system degradation is "severe."

In various embodiments, a composite score satisfying the threshold value indicates that a given modem is the source, or a part of the source, of the return system degradation. This may be the result of a compromised shield in a drop cable or a home cable and/or caused by interference from another device within the customer site. However, when the composite score does not satisfy the threshold value, a problem may exist with a common system element rather than an individual modem at a customer site. In embodiments, the composite score may satisfy the threshold value when the composite score exceeds the threshold value. For example, a cable modem device having power diverted through the equalizer measured at ≥−15.0 dB and a transmit power level measured at ≤42.0 dBmV has a composite score of 24. And as such, the cable modem device is identified as being the source (or a part of the source) of return system degradation. However, it should be understood that the transmit power level of the cable modem device or the power diverted through the equalizer tap of the cable modem device may be sufficient alone to cause return system degradation. For example, as illustrated in Table 1, when the power diverted through the equalizer tap of a cable modem device is ≥−10.0 dB, the assigned score is 20 and exceeds the threshold value of 19. Thus, the power diverted through the equalizer tap of the cable modem device ≥−10.0 dB is a critical level. Although not illustrated in Table 2, the transmit power level of the modem could likewise be sufficient alone to cause return system degradation.

In further embodiments, the composite score may satisfy the threshold value when the composite score falls within the range of the threshold value. For example, the threshold value may comprise a first range and a second range. In some embodiments, the first range may indicate that the contribution of the cable modem device to the return system degradation is "moderate," and the second range may indicate that the contribution of the cable modem device to the return system degradation is "severe." For example, a cable modem device having power diverted through the equalizer measured at ≥−20.0 dB and a transmit power level measured at ≤42.0 dBmV has a composite score of 19. And as such, the cable modem device is identified as moderately contributing to the return system degradation. In another example, a cable modem device having power diverted through the equalizer measured at ≥−15.0 dB and a transmit power level measured at ≤46.0 dBmV has a composite score of 21. And as such, the cable modem device is identified as severely contributing to the return system degradation. It should be understood that the transmit power level of the cable modem device or the power diverted through the equalizer tap of the cable modem device may be sufficient alone to cause moderate or severe contribution to the return system degradation.

The initiating the work order to repair the cable modem device 350 comprises generating a request for a proactive service truck for the cable modem device(s) causing the return system degradation. Alternatively, the initiating the work order to repair the cable modem device 350 comprises transmitting a signal to the cable modem device(s) causing the return system degradation, such that the cable modem device(s) resets its operating state. In this way, the present disclosure can be used to proactively repair the cable system 100 prior to receiving any customer complaints or loss in services to customer sites. In embodiments, when a plurality of cable modem devices are identified as sources of the return system degradation, the initiating the work order 350 may be based on rankings of the plurality of cable modem devices according to their respective composite scores. For example, a first cable modem device having a highest composite score may be serviced or reset first, a second cable modem device having a second highest composite score may be serviced or reset second, and so on so forth. Thus, a cable modem device having the largest impact on the return system degradation is prioritized and may be serviced or reset first in order to minimize the return system degradation as efficiently and effectively as possible.

Figure 4:
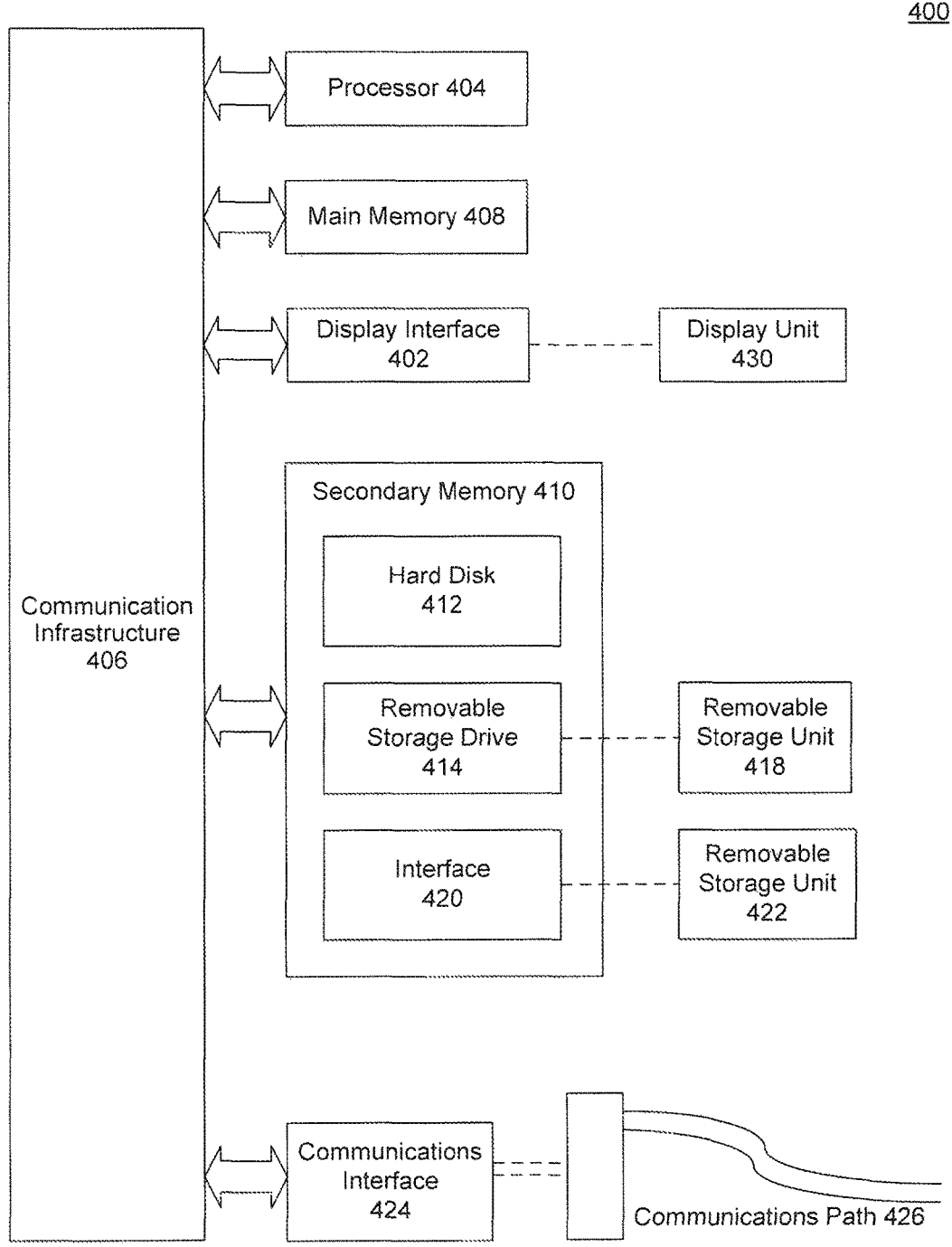
FIG. 4 illustrates an example computer system which can be used to implement embodiments according to aspects of the present disclosure.

Various aspects of the disclosure can be implemented by software, firmware, hardware, or a combination thereof. FIG. 4 illustrates an example computer system 400 in which some embodiments, or portions thereof, can be implemented as computer-readable code. Various embodiments are described in terms of the example computer system 400. After reading this description, it will become apparent to a person skilled in the relevant art how to implement the embodiments using other computer systems and/or computer architectures.

Computer system 400 includes one or more processors, such as processor 404. Processor 404 may comprise suitable logic, circuitry, dedicated circuits, and/or code that may enable processing data and/or controlling operations of computer system 400. Processor 404 can be a special purpose or a general purpose processor. Processor 404 is connected to a communication infrastructure 406 (for example, a bus or network). Processor 404 may be enabled to provide control signals to the various other portions of computer system 400 via communication infrastructure 406, for example.

Computer system 400 also includes a main memory 408, and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium can also refer to memories, such as main memory 408 and secondary memory 410, which can be memory semiconductors (e.g., DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the embodiments as discussed herein. In particular, the computer programs, when executed, enable processor 404 to implement the disclosed processes. Accordingly, such computer programs represent controllers of the computer system 400. Where the embodiments are implemented using software, the software may be stored in a computer program product and loaded into computer system 400 using removable storage drive 414, interface 420, hard drive 412 or communications interface 424. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system for determining a cable modem device from among a plurality of cable modem devices of a cable system that is impacted by system degradation, the system comprising:
   a memory that stores one or more instructions to identify the cable modem device that is impacted by the system degradation; and
   one or more processors configured to execute the one or more instructions, the one or more instructions, when executed by the one or more processors, configuring the one or more processors to:
      receive a plurality of transmit power levels from the plurality of cable modem devices in response to receiving an indication that the cable system is impacted by the system degradation,
      score the plurality of transmit power levels to provide a plurality of scores corresponding to the plurality of cable modem devices, lesser transmit power levels from among the plurality of transmit power levels corresponding to greater scores from among the plurality of scores and greater transmit power levels from among the plurality of transmit power levels corresponding to lesser scores from among the plurality of scores, and
      compare the plurality of scores to a threshold value to identify the cable modem device that is impacted by the system degradation.

2. The system of claim 1, wherein the one or more instructions, when executed by the one or more processors, further configure the one or more processors to:
   poll the plurality of cable modem devices for the plurality of transmit power levels in response to receiving the indication.

3. The system of claim 1, wherein the one or more instructions, when executed by the one or more processors, further configure the one or more processors to:
   initiate a service order to dispatch a repairman to troubleshoot the cable modem device.

4. The system of claim 1, wherein the one or more instructions, when executed by the one or more processors, further configure the one or more processors to:
   signal the cable modem device to adjust its signal to correct for the system degradation.

5. The system of claim 1, wherein the one or more instructions, when executed by the one or more processors, further configure the one or more processors to:
   perform additional analysis on the plurality of cable modem devices when two or more cable modem devices from among the plurality of cable modem devices are identified as being impacted by the system degradation.

6. The system of claim 1, wherein the system degradation comprises return system degradation.

7. The system of claim 1, wherein a first score for a first transmit power level from among the scored plurality of transmit power levels corresponding to a first cable modem device from among the plurality of cable modem devices is greater than a second score for a corresponding second transmit power level from among the scored plurality of transmit power levels corresponding to a second cable modem device from among the plurality of cable modem devices when the first transmit power level is less than the corresponding second transmit power level.

8. A system for correcting for system degradation caused by a cable modem device from among a plurality of cable modem devices of a cable system, the system comprising:
   a memory that stores one or more instructions to identify the cable modem device that is impacted by the system degradation; and
   one or more processors configured to execute the one or more instructions, the one or more instructions, when executed by the one or more processors, configuring the one or more processors to:
      receive a plurality of transmit power levels from the plurality of cable modem devices,
      score the plurality of transmit power levels for each cable modem device from among the plurality of cable modem devices to provide a plurality of scores for the plurality of cable modem devices, lesser transmit power levels from among the plurality of transmit power levels corresponding to greater scores from among a plurality of scores corresponding to the plurality of cable modem devices and greater transmit power levels from among the plurality of transmit power levels corresponding to lesser scores from among the plurality of scores, identify the cable modem device from among the plurality of cable modem devices based upon a comparison of the plurality of scores and a threshold value, and signal the cable modem device to adjust its signal to correct for the system degradation.

9. The system of claim 8, wherein the one or more instructions, when executed by the one or more processors, further configure the one or more processors to:

receive an indication that a node from among a plurality of nodes of the cable system is impacted by the system degradation; and poll the plurality of cable modem devices for the plurality of transmit power levels in response to receiving the indication.

10. The system of claim 8, wherein the one or more instructions, when executed by the one or more processors, further configure the one or more processors to:

perform additional analysis on the plurality of cable modem devices when two or more cable modem devices from among the plurality of cable modem devices are identified as being impacted by the system degradation.

11. The system of claim 8, wherein a first score for a first transmit power level from among the scored plurality of transmit power levels corresponding to a first cable modem device from among the plurality of cable modem devices is greater than a second score for a corresponding second transmit power level from among the scored plurality of transmit power levels corresponding to a second cable modem device from among the plurality of cable modem devices when the first transmit power level is less than the corresponding second transmit power level.

12. The system of claim 8, wherein the one or more instructions, when executed by the one or more processors, configure the one or more processors to:

compare the plurality of scores to a threshold value to identify the cable modem device that is impacted by the system degradation.

13. A method for determining a cable modem device from among a plurality of cable modem devices of a cable system that is impacted by system degradation, the method comprising:

receiving, by a server of the cable system, a plurality of transmit power levels from the plurality of cable modem devices in response to receiving an indication that the cable system is impacted by the system degradation;

scoring, by the server of the cable system, transmit power levels from among the plurality of transmit power levels for each cable modem device from among the plurality of cable modem devices to provide a plurality of scores corresponding to the plurality of cable modem devices, lesser transmit power levels from among the plurality of transmit power levels corresponding to greater scores from among the plurality of scores and greater transmit power levels from among the plurality of transmit power levels corresponding to lesser scores from among the plurality of scores; and comparing, by the server of the cable system, the plurality of scores to a threshold value to identify the cable modem device that is impacted by the system degradation.

14. The method of claim 13, further comprising:

performing, by the server of the cable system, additional analysis on the plurality of cable modem devices when two or more cable modem devices from among the plurality of cable modem devices are identified as being impacted by the system degradation.

15. The method of claim 13, wherein a first score for a first transmit power level from among the scored plurality of transmit power levels corresponding to a first cable modem device from among the plurality of cable modem devices is greater than a second score for a corresponding second transmit power level from among the scored plurality of transmit power levels corresponding to a second cable modem device from among the plurality of cable modem devices when the first transmit power level is less than the corresponding second transmit power level.

16. The system of claim 1, wherein the one or more instructions, when executed by the one or more processors, further configure the one or more processors to:

receive a plurality of equalizer tap power levels diverted through a plurality of equalizer taps of the plurality of cable modem devices from the plurality of cable modem devices in response to receiving the indication;

score equalizer tap power levels from among the plurality of equalizer tap power levels for each cable modem device from among the plurality of cable modem devices to provide a second plurality of scores corresponding to the plurality of cable modem devices; and compile the scored plurality of transmit power levels and the second plurality of scores for each cable modem device from among the plurality of cable modem devices to provide a plurality of composite scores for the plurality of cable modem devices.

17. The system of claim 16, wherein the one or more instructions, when executed by the one or more processors, configure the one or more processors to compare the plurality of composite scores to the threshold value to identify the cable modem device that is impacted by the system degradation.

18. The system of claim 8, wherein the one or more instructions, when executed by the one or more processors, further configure the one or more processors to:

receive a plurality of equalizer tap power levels diverted through a plurality of equalizer taps of the plurality of cable modem devices from the plurality of cable modem devices in response to receiving the indication;

score equalizer tap power levels from among the plurality of equalizer tap power levels for each cable modem device from among the plurality of cable modem devices to provide a second plurality of scores corresponding to the plurality of cable modem devices; and compile the scored plurality of transmit power levels and the second plurality of scores for each cable modem device from among the plurality of cable modem devices to provide a plurality of composite scores for the plurality of cable modem devices, and wherein the one or more instructions, when executed by the one or more processors, configure the one or more processors to compare the plurality of composite scores to the threshold value to identify the cable modem device that is impacted by the system degradation.

19. The method of claim 13, further comprising:

receiving, by the server of the cable system, a plurality of equalizer tap power levels diverted through a plurality of equalizer taps of the plurality of cable modem devices from the plurality of cable modem devices in response to receiving the indication;

scoring, by the server of the cable system, equalizer tap power levels from among the plurality of equalizer tap power levels for each cable modem device from among the plurality of cable modem devices to provide a second plurality of scores corresponding to the plurality of cable modem devices; and compiling, by the server of the cable system, the scored plurality of transmit power levels and the second plurality of scores for each cable modem device from among the plurality of cable modem devices to provide a plurality of composite scores for the plurality of cable modem devices, wherein the comparing comprises:
  comparing, by the server of the cable system, the plurality of composite scores to the threshold value to identify the cable modem device that is impacted by the system degradation.

\* \* \* \* \*